(12) United States Patent
Hendricks, Jr. et al.

(10) Patent No.: US 12,416,220 B2
(45) Date of Patent: Sep. 16, 2025

(54) INTEGRATED WELLSITE SYSTEM AND METHOD FOR IN-SITU CO2 GAS CAPTURE, CARBONATION AND SEQUESTRATION

(71) Applicant: Patterson—UTI Drilling Company LLC, Houston, TX (US)

(72) Inventors: William Andrew Hendricks, Jr., Houston, TX (US); Abelardo A. Gallo, Houston, TX (US); Roger Bartlett Willis, Meadville, PA (US)

(73) Assignee: PATTERSON-UTI DRILLING COMPANY LLC, Houston, TX (US)

( * ) Notice: Subject to any disclaimer, the term of this patent is extended or adjusted under 35 U.S.C. 154(b) by 0 days.

(21) Appl. No.: 18/341,493

(22) Filed: Jun. 26, 2023

(65) Prior Publication Data

US 2023/0349267 A1    Nov. 2, 2023

Related U.S. Application Data

(63) Continuation-in-part of application No. 18/158,118, filed on Jan. 23, 2023.

(60) Provisional application No. 63/379,855, filed on Oct. 17, 2022, provisional application No. 63/335,798, filed on Apr. 28, 2022.

(51) Int. Cl.
  *E21B 41/00*   (2006.01)
  *B01F 23/237*  (2022.01)
  *E21B 43/26*   (2006.01)
  *B01F 101/49*  (2022.01)

(52) U.S. Cl.
  CPC .... *E21B 41/0064* (2013.01); *B01F 23/23762* (2022.01); *E21B 43/2607* (2020.05); *B01F 2101/49* (2022.01)

(58) Field of Classification Search
  CPC ............ E21B 41/0064; E21B 41/0057; E21B 41/005; E21B 43/2607; E21B 43/2605; E21B 43/26; E21B 43/267; C09K 8/62; C09K 8/60; C09K 8/80; C09K 8/66; C09K 8/665; C09K 8/68; C09K 8/84; C09K 8/845; C09K 8/86
  USPC ....................................... 166/75.11
  See application file for complete search history.

(56) References Cited

U.S. PATENT DOCUMENTS

| 9,133,700 B2 * | 9/2015 | Lissianski ............. E21B 43/164 |
| 12,116,868 B2 | 10/2024 | Skeels |
| 2017/0089188 A1 * | 3/2017 | Vandigriff ............. E21B 43/164 |

(Continued)

*Primary Examiner* — Angela M Ditrani Leff
(74) *Attorney, Agent, or Firm* — Jackson Walker LLP (57) ABSTRACT

The disclosure provides a system to capture on-site greenhouse gas, such as carbon dioxide, from exhausts of greenhouse gas emission sources. The carbon dioxide is mixed with water to form a carbonated fracking fluid portion to combine with a proppant fracking fluid to form the fracking fluid for injection into a subsurface. The carbon dioxide in the carbonated fracking fluid portion is then sequestered into the formation through chemical attraction. The system can be an in-situ closed loop system in that the capture of the wellsite's carbon dioxide emissions and injection into the formation occur at the same wellsite or nearby wellsites in the same field to avoid long-term surface storage and transportations. The system can be modular, scalable, and transportable. The system can be installed as decentralized individual units coupled with each greenhouse gas generating equipment at the wellsite.

9 Claims, 8 Drawing Sheets

(56) References Cited

U.S. PATENT DOCUMENTS

| | | | |
|---|---|---|---|
| 2019/0154020 A1* | 5/2019 | Glass | H02P 27/06 |
| 2023/0050823 A1* | 2/2023 | Darrah | E21B 43/281 |
| 2023/0167715 A1* | 6/2023 | Zhou | C01F 5/24 |
| | | | 166/402 |

* cited by examiner

INTEGRATED WELLSITE SYSTEM AND METHOD FOR IN-SITU CO2 GAS CAPTURE, CARBONATION AND SEQUESTRATION

CROSS REFERENCE TO RELATED APPLICATIONS

This application claims the benefit of U.S. Provisional Application Ser. No. 63/379,855 entitled "Integrated Wellsite System and Method for Exhaust Gas Collection and Sequestration", filed Oct. 17, 2022, and is a continuation-in-part of U.S. application Ser. No. 18/158,118, entitled "Integrated Wellsite System and Method for Greenhouse Gas Capture and Sequestration", filed Jan. 23, 2023, which claims the benefit of U.S. Provisional Application Ser. No. 63/335,798, entitled "Integrated Wellsite System and Method for Greenhouse Gas Capture and Sequestration", filed Apr. 28, 2022, all of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to efficient capture and sequestration of potentially harmful greenhouse gases at a wellsite. More specifically, the disclosure relates to capture and sequestration at a wellsite of generated carbon dioxide through carbonation and injection into a subsurface formation.

Description of the Related Art

A growing concern in environmental protection is the increase of greenhouse gases. Greenhouse gases absorb and radiate heat gradually over time and help moderate global temperatures. However, an overabundance of greenhouse gases is believed to cause climate change and harm to the environment.

Figure 1:
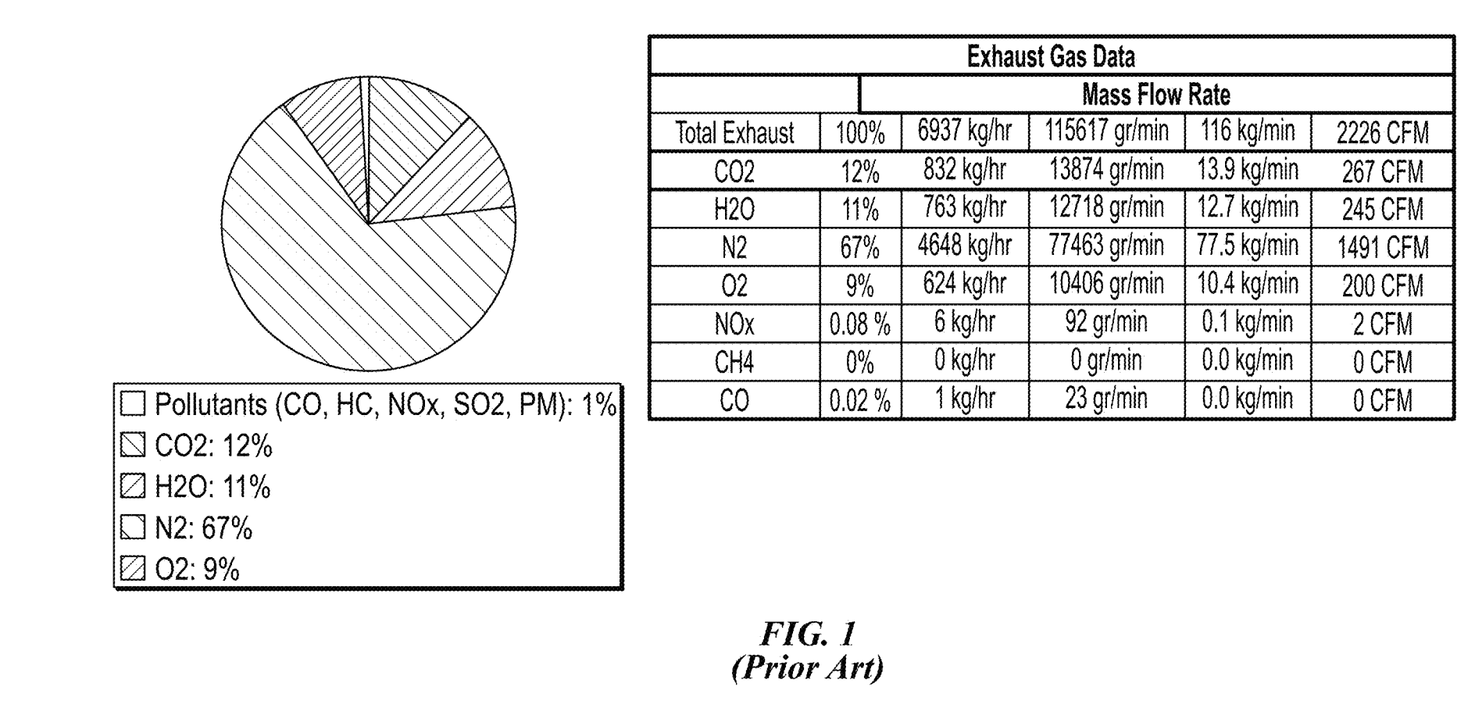
FIG. 1 is an exemplary pie chart and table illustrating a typical exhaust gas composition from internal combustion engines.

FIG. 1 is an exemplary pie chart and table illustrating a typical exhaust gas composition from internal combustion engines. Greenhouse gases include carbon dioxide, methane, nitrous oxide, and others. A typical composition of exhaust gas from a diesel engine is: carbon dioxide of about 12%, methane, nitrous oxide, and others of about 1%, nitrogen of about 67%, oxygen of about 9%, and water of about 11%.

Carbon dioxide absorbs less heat than methane and nitrous oxide, but is far more abundant and stays in the atmosphere much longer. Some studies show that increases in atmospheric carbon dioxide contribute to about two-thirds of an apparent total energy imbalance that is believed to be causing Earth's temperature to rise.

Significant efforts are being made to reduce production of greenhouse gases, particularly carbon dioxide due to its volume generated from combustion engines using fossil fuels that exhaust the carbon dioxide. However, current technology and infrastructure heavily relies on fossil fuels and the associated engines for a functional society. Examples of such use of large is fossil fuel engines are wellsite electric power generation equipment, such as in oilfield drilling, completion, and production platforms operations, as well as powering fracturing equipment (also known as frack pumps) in unconventional fracturing operations where tens of thousands of hydraulic horsepower (HHP) are needed for a single wellsite for the various operations.

Figure 2:
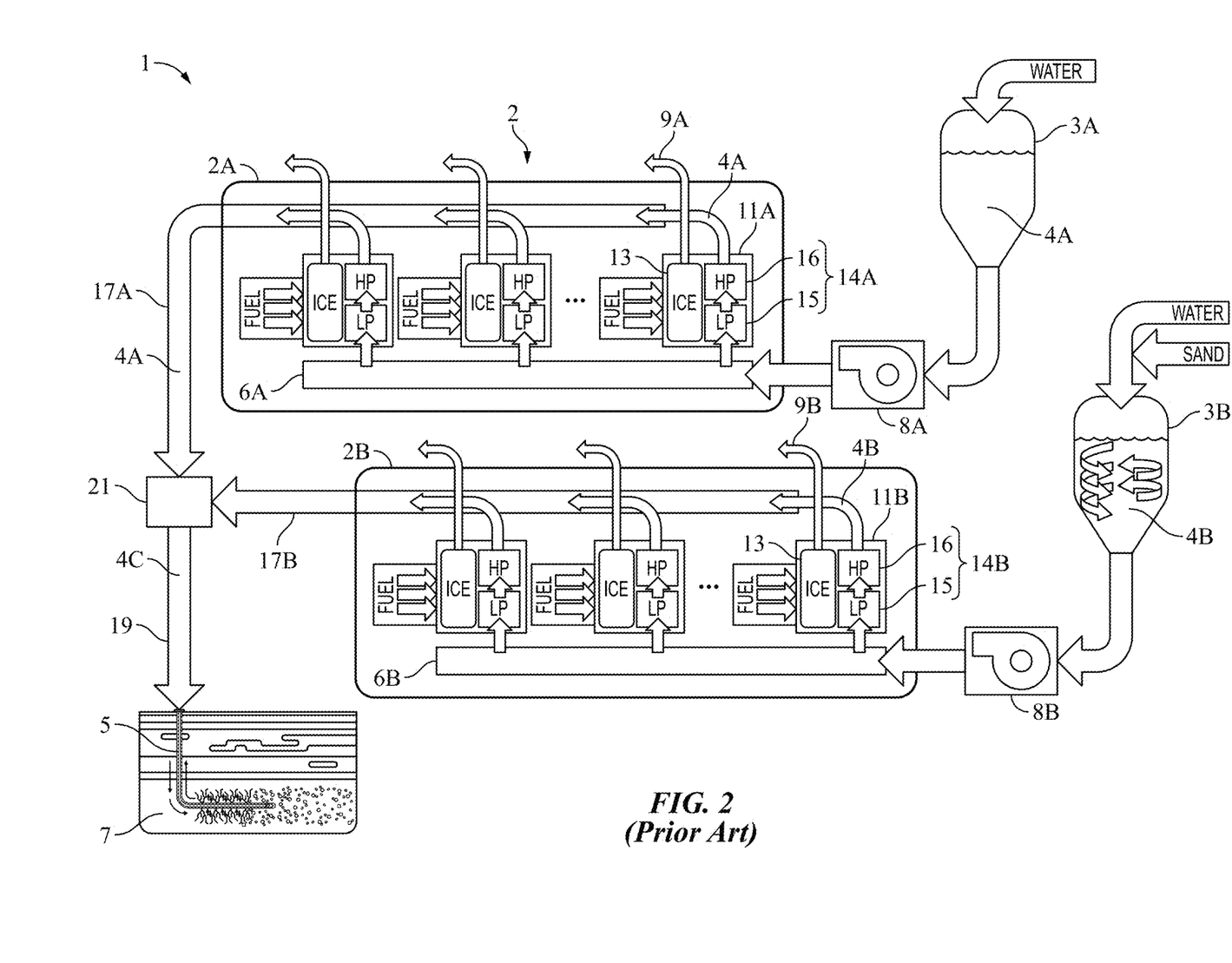
FIG. 2 is a schematic diagram showing known split stream fracking system.

FIG. 2 is a schematic diagram of a system with fossil fuel equipment for a typical wellsite during an unconventional formation fracturing operation with typical emissions of greenhouse gases. The wellsite 1 with fracking capabilities includes a fracking system 2 having split stream configuration wherein one fracking portion 2A provides a water fracking fluid portion 4A of a blend of water and additives, and another fracking portion 2B provides a proppant fracking fluid portion 4B of a blend of water, fracking proppants such as sand, and additives. The combination of the water fracking fluid portion 4A and the proppant fracking fluid portion 4B in a fracking combiner 21 result in a fracking fluid 4C that can be pumped through a fracking conduit 19 and injected at high pressure through a well 5 into a subsurface formation 7 for fracking the formation by opening portions of the formation for greater hydrocarbon production.

The fracking system portion 2A includes a blender 3A into which water is added and blended with the additives and ambient air to form the water fracking fluid portion 4A. The water fracking fluid portion 4A can be discharged from the blender 3A through a discharge pump 8A into a suction distribution manifold 6A. The fracking system portion 2A further includes generally several fracking units 11A for pressurizing the water fracking fluid portion 4A into a suitable pressure for fracking. A fracking unit 11A generally includes an internal combustion engine (ICE) 13 that is coupled to a fracking pump 14A. The ICE 13 Is provided with hydrocarbon fuel, such as diesel, gasoline, propane, or natural gas, and air for combustion. The fracking pump includes a low-pressure portion 15 that receives the water fracking fluid portion 4A. A typical pressure at the inlet of the low-pressure portion is less than 150 pounds per square inch (psi). The low-pressure portion 15 transfers the water fracking fluid portion 4A to a high-pressure portion 16. The high-pressure portion 16 increases the pressure of the water fracking fluid portion 4A to generally higher than 8,000 psi and is discharged into a discharge collection manifold 17A for later combination with the proppant fracking fluid portion 4B.

Similarly, the fracking system portion 2B includes a blender 3B into which water is blended with additives, with fracking proppants provided from a hopper, and ambient air to form the proppant fracking fluid portion 4B. The proppant fracking fluid portion 4B can be discharged is from the blender 3B through a discharge pump 8B into a suction distribution manifold 6B. The fracking system portion 2B further includes generally several fracking units 11B for pressurizing the proppant fracking fluid portion 4B into a suitable pressure for fracking. A fracking unit 11B, like the fracking unit 11A, generally includes an ICE 13 coupled to a fracking pump 14B with a low-pressure portion 15 and a high-pressure portion 16. The low-pressure portion 15 receives the proppant fracking fluid portion 4B at pressures less than 150 psi, transfers the low-pressure portion to the high-pressure portion 16 to increase the pressure to a fracking pressure and is discharged into a discharge collection manifold 17B for later combination with the water fracking fluid portion 4A.

The ICEs produce combustion exhaust gases 9A and 9B (collectively 9) in the process. Studies estimate that exhaust gases from a fleet of ICEs 13 used during a fracturing operation can produce up to 250 tons of carbon dioxide per day for emission into the atmosphere. Until alternative forms of power generation equipment become commercially available, the fossil fuel power generation equipment will be needed and, without a solution, will continue to produce carbon dioxide that is released into the atmosphere.

Therefore, there is a need for a system and method for capture and sequestration of greenhouse gases, such as carbon dioxide, at or near the wellsite to reduce the amount of greenhouse gases being released to the atmosphere.

BRIEF SUMMARY OF THE INVENTION

The disclosure provides a system to capture on-site greenhouse gas, such as carbon dioxide, from exhausts of greenhouse gas emission sources. The carbon dioxide is mixed with water to form a carbonated fracking fluid portion to combine with a proppant fracking fluid to form the fracking fluid for injection into a subsurface. The carbon dioxide in the carbonated fracking fluid portion is then sequestered into the formation through chemical attraction. The system can be an in-situ closed loop system in that the capture of the wellsite's carbon dioxide emissions and injection into the formation occur at the same wellsite or nearby wellsites in the same field to avoid long-term surface storage and transportations. The system can be modular, scalable, and transportable. The system can be installed as decentralized individual units coupled with each greenhouse gas generating equipment at the wellsite.

The disclosure also provides an integrated system for capture of carbon dioxide to dissolve in water for injection and sequestration of the carbon dioxide downhole, the system configured to interface with wellsite exhaust gas generation equipment that generates exhaust gas having carbon dioxide and fracking equipment that injects a flow stream of high-pressure fracking fluid into a downhole geological formation, comprising: a carbon dioxide capture equipment for separating carbon dioxide from the exhaust gas; a carbonation equipment configured to dissolve the carbon dioxide into water and form a carbonated fracking fluid portion; a carbon dioxide capture fracking unit configured to increase pressure of the carbonated fracking fluid portion; a proppant fracking fluid portion having proppant; a proppant fracking unit configured to increase pressure of the proppant fracking fluid portion; a fracking combiner configured to combine the carbonated fracking fluid portion and the proppant fracking fluid portion to form a carbonated fracking fluid; and a fracking conduit fluidicly coupled to a subsurface formation for sequestration of carbon dioxide dissolved in the carbonated fracking fluid.

The disclosure also provides a method for sequestering carbon dioxide into a subsurface formation comprising, comprising: flowing exhaust gas having carbon dioxide into a carbonation fracking system portion having carbon dioxide capture equipment; separating the carbon dioxide from the exhaust gas; flowing the carbon dioxide to carbonation equipment; dissolving at least a portion of the carbon dioxide into water to form a carbonated fracking fluid portion; flowing the carbonated fracking fluid portion into a carbonation fracking pump; pressurizing the carbonated fracking fluid portion to a higher pressure than a pressure before the carbonation fracking pump; flowing the carbonated fracking fluid portion into a fracking combiner; flowing a mixture of water and proppant to form a proppant fracking fluid portion; flowing the proppant fracking fluid portion into a proppant fracking pump; pressurizing the proppant fracking fluid portion to a higher pressure than a pressure before the proppant fracking pump; flowing the pressurized proppant fracking fluid into the fracking combiner; combining the carbonated fracking fluid portion and the proppant fracking fluid portion to form a carbonated fracking fluid; flowing the carbonated fracking fluid into a subsurface formation; fracking the subsurface formation with the carbonated fracking fluid; and sequestering at least a portion of carbon dioxide in the carbonated fracking fluid into the formation.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a controller would encompass a processor and a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. Any expressions of percentage ranges and other ranges herein are inclusive, unless stated otherwise, and increments of the range can increase and decrease by integer numbers or fractions, so that for example a range of 0 to 10 includes 0 and 10 and any and all integers therebetween (e.g. 1, 2, 3 . . . ) and any and all fractions between each integer (e.g. 0.1, 0.2, 0.3, . . . and 0.01, 0.02, 0.03, . . . , and so forth). Ranges are meant to be inclusive, unless stated otherwise. The term "in-situ" as used herein is intended to include movement, including transportation within an area encompassed by a field of production or exploration. The term "wellsite" as used herein is intended to mean an area encompassing at least one well within a field of production or exploration and surrounding area used for operations conducted on the at least one well. The term "sequestration:" as used herein is intended to mean a storage of gas in any phase in a subsurface formation, such as by adsorption or absorption; in a surface opening, such as a well, reservoir, or other cavity; in a designated long term storage facility; in storage containers for use in enhanced oil recovery facilities; in storage containers for industrial or commercial use in processes; or in other storage containers in which use reduce an amount of gas entering the Earth's atmosphere.

The disclosure provides a system to capture on-site greenhouse gas, such as carbon dioxide, from exhausts of greenhouse gas emission sources. The carbon dioxide is mixed with water to form a carbonated fracking fluid portion to combine with a proppant fracking fluid to form the fracking fluid for injection into a subsurface. The carbon dioxide in the carbonated fracking fluid portion is then sequestered into the formation through chemical attraction. The system can be an in-situ closed loop system in that the capture of the wellsite's carbon dioxide emissions and injection into the formation occur at the same wellsite or nearby wellsites in the same field to avoid long-term surface storage and transportations. The system can be modular, scalable, and transportable. The system can be installed as decentralized individual units coupled with each greenhouse gas generating equipment at the wellsite.

Figure 3:
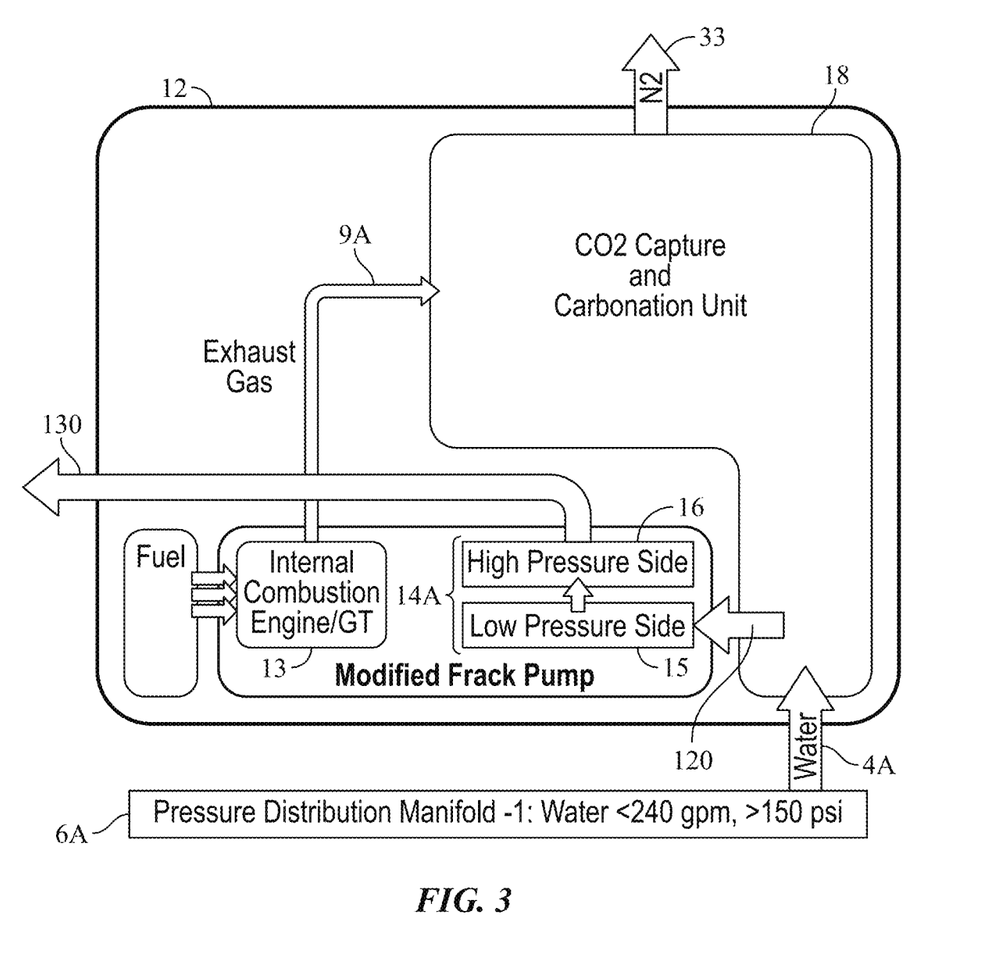
FIG. 3 is a schematic diagram of an exemplary embodiment of a carbon dioxide capture fracking unit according to the invention.

FIG. 3 is a schematic diagram of an exemplary embodiment of a carbon dioxide capture fracking unit according to the invention. In general, a carbon dioxide capture fracking unit 12 can preferably be substituted for each fracking unit 11A, described above in FIG. 2. The carbon dioxide capture fracking unit 12 is similar to the fracking unit 11A with the ICE 13 and fracking pump 14A, but further provides a carbon dioxide capture and carbonation unit 18 to receive the exhaust gas 9A produced by the ICE 13. Whole exhaust gas 9A will not dissolve nitrogen, oxygen, and other components referenced above for FIG. 1 at the same conditions of pressure and temperature that carbon dioxide does. Given the volume and environmental concern for carbon dioxide, the focus is to sequester carbon dioxide. The unit 18 can separate carbon dioxide from remaining components of the exhaust gas 9A, and retain the carbon dioxide for processing while exhausting the remaining exhaust gas components 33, which are believed to be less harmful by nature or by quantity or both, such as nitrogen and oxygen. The goal of the carbon dioxide capture equipment is a purified carbon dioxide 110, described in FIG. 4, of a desired composition for a next step in the system process. Without limitation, a desirably purified carbon dioxide would be as pure as the equipment permits.

The carbon dioxide can then be processed by the unit 18 to carbonate the incoming water fracking fluid portion 4A to form a carbonated fracking fluid portion 120. The carbonated fracking fluid portion 120 can be provided to the low pressure portion 15 of the fracking pump 14 and then flow to the high pressure portion 16 to increase the pressure of the carbonated fracking fluid portion 120 into a high-pressure carbonated fracking fluid portion 130. Thus, the water fracking fluid portion 4A is transformed into a high-pressure carbonated fracking fluid portion 130 that can then flow into the discharge collection manifold 17A, as described above.

Figure 4:
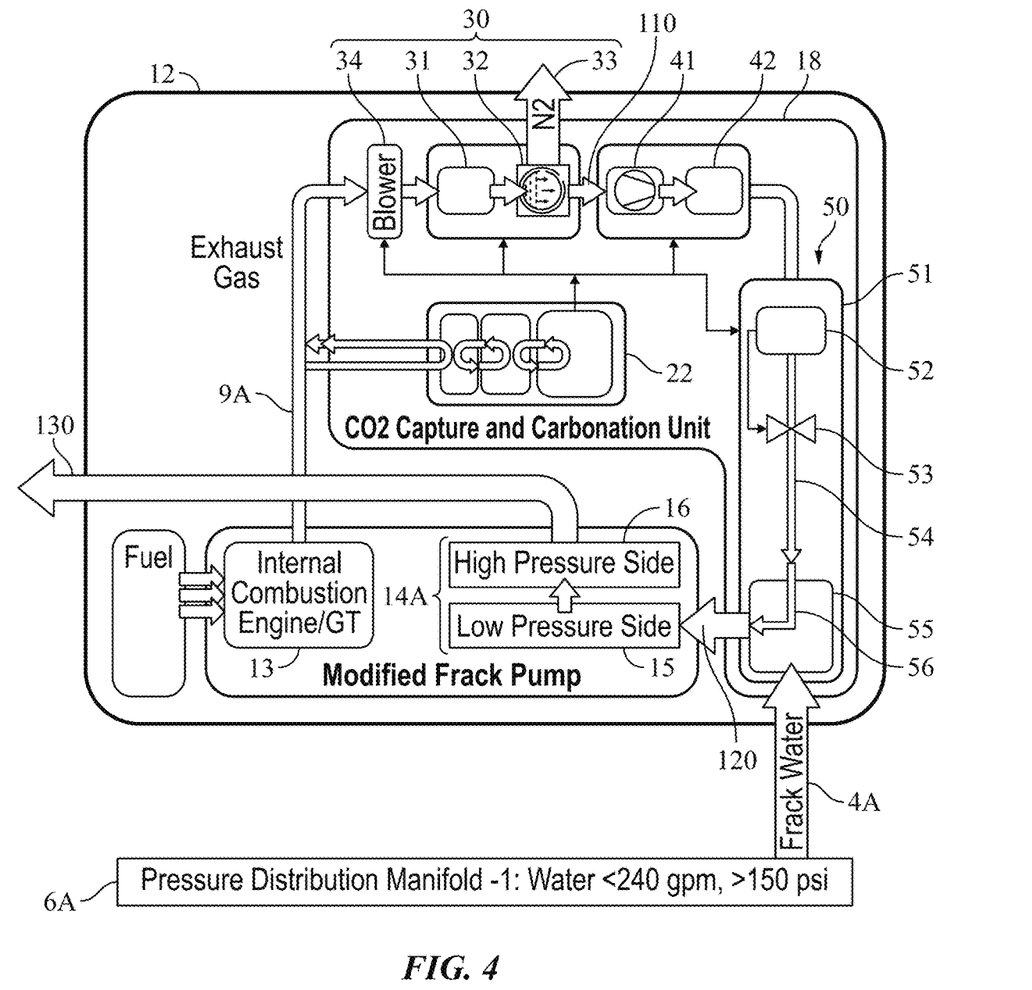
FIG. 4 is a detailed schematic diagram of the exemplary carbon dioxide capture and carbonation unit of FIG. 3.

FIG. 4 is a detailed schematic diagram of the exemplary carbon dioxide capture and carbonation unit of FIG. 3. In more detail, the carbon dioxide capture and carbonation unit 18 of the carbon dioxide capture fracking unit 12 receives the exhaust gas 9A from the ICE 13, where at least a portion of the exhaust gas can pass through an optional waste heat power generation system 22, described in more detail below. The waste heat power generation system 22 can provide energy to power the various components of the carbon dioxide capture and carbonation unit 18.

The exhaust gas 9A can flow into carbon dioxide capture equipment 30, such as an exhaust gas blower 34. The blower provides additional energy for the exhaust gas 9A to pass through stages of the unit 18, and assist in minimizing back pressure on the ICE. The exhaust gas 9A can flow through exhaust gas cooler 31 and through a carbon dioxide filter 32. The term "filter" is used broadly to include any method of separating the gases. In one embodiment, it can use a physical and/or chemical absorption method. In this method, the carbon dioxide gas filter can use specialized liquid chemicals, such as amine solvents with any regeneration process for capturing and releasing the desired gas(es). In another embodiment, the carbon dioxide gas filter equipment can include physical and/or chemical adsorption method. In this method the carbon dioxide gas filter can use specialized materials such as, metallic organic frameworks (MOFs), melamine porous networks, graphene, zeolites, each of which use specific principles for capture the CO2 and requires specific methods for releasing the CO2 and regenerating the filter for further CO2 captures. In another embodiment, the carbon dioxide gas filter equipment can include physical separation like in membranes of different types. In another embodiment, the carbon dioxide gas capture equipment can biological filtering methods. Still further, in other embodiments, the carbon dioxide gas capture equipment can include temperature, including cryogenic, equipment and related processes for capturing the desired gas(es). The carbon dioxide filter 32 can filter the carbon dioxide from the exhaust gas and pass a carbon dioxide into the rest of the unit 18, while allowing the remaining exhaust gas components 33 to be exhausted from the unit 18. Optionally, the exhaust gas collection equipment can include ancillary equipment, including without limitation prefilters for particulates, liquids, and other contaminates for a cleaner gas effluent from the exhaust gas collection equipment; pressure compensators; controls; and other appropriate features with the collection of gases, while avoiding performance-affecting back pressure into ICEs. Another option is a vacuum pump can be coupled downstream of the filter 32 to provide differential pressure to provide additional energy to the carbon dioxide to pass through stages of the system.

The purified carbon dioxide 110 from the exhaust gas can flow into a gas compressor 41. The compressor 41 can increase the pressure to a suitable pressure for carbonation. Advantageously, a buffer tank 42 can provide transient storage for the purified carbon dioxide 110 to provide the carbon dioxide at a sufficient pressure to enable a steady delivery as the carbon dioxide is used to carbonate incoming water from the water fracking fluid portion 4A. The carbon dioxide flows into a container 51 having carbonation equipment 50 for carbonation. The carbonation equipment 50 can include a regulator 52 coupled a valve 53 to control a pressure and flow of the carbon dioxide through a carbon dioxide conduit 54 during the carbonation. The carbon dioxide can flow through the carbon dioxide conduit 54 into a diffuser 56 in a carbonation zone 55. Also, the water fracking fluid portion for a flowing from the suction distribution manifold 6A can flow into the carbonation zone 55. The carbon dioxide is advantageously injected into the water flow at pressures sufficient to dissolve the carbon dioxide to form carbonated water. Instant carbonation refers to the rapid dissolution of carbon dioxide gas into a liquid, usually water or a beverage to create a carbonated product, as used in the beverage industry to produce carbonated soft drinks. Carbon dioxide is introduced into the liquid under high-pressure which promotes rapid dissolution of the gas. The solubility of carbon dioxide and water increases with higher pressure and lower temperature. Therefore, instant carbonation is usually performed under controlled conditions to ensure the desired level of carbonation is achieved. Using this concept, the invention dissolves the carbon oxide into the water fracking fluid portion 4A. For example, a flow of 250 gallons per minute of the water fracking portion 4A at sufficient pressures, used to dissolve the carbon dioxide into the water. A steady carbon dioxide flow advantageously can be at a higher pressure than the water in the water fracking fluid portion 4A, such as about 100 psi higher.

The diffuser 56 can cause the carbon dioxide to be separated into small portions that can bubble into the water for a more effective absorption of the carbon dioxide by the water. One exemplary diffuser can be a sparger, such as a porous metal sparger. Using a sparger made of porous material can increase the speed of carbonation compared to other diffusers, such as a sparger with holes drilled in a pipe. The porous materials, such as sintered stainless steel or porous ceramics, provide a large surface area for gas, liquid contact. The larger surface area enables a higher number of smaller gas bubbles to be formed, which can lead to more efficient gas dissolution any faster carbonation process. While the bubble size can vary, often porous metal spargers produce bubble sizes in the range of 10 to 100 µm. Finer bubbles in the lower end of this range are advantageous for increased efficiency in gas-liquid, mass transfer with the smaller bubbles having a higher surface area to volume ratio.

Carbon dioxide dissolves in water much better than many other gases, because it contains polar bonds, and reacts with water to create carbonic acid. Solubility is the amount that a substance can dissolve into a solvent at its saturation point. Carbon dioxide's solubility in water is in dynamic equilibrium, meaning that the concentration of gaseous and dissolved carbon dioxide is staying the same because a rate of the reaction in each direction is equal. If the equilibrium is shifted, the products and reactants will change to move back to equilibrium, so if a product was removed, the reaction would shift and more products would be formed. For a representation of the principle, carbon dioxide gas (g) can be in the following equilibria, where (aq) indicates a dissolved amount of a substance:

$$CO2(g) \rightleftharpoons CO2(aq) \text{ and } CO2(aq)+H2O(l) \rightleftharpoons H2CO3(aq)$$

If there is more carbon dioxide in water, the water will become more acidic because carbonic acid is produced. Carbon dioxide dissolves in water more at higher partial pressures, and dissolves in water less at higher temperatures. This dynamic equilibrium is explained in more detail in FIG. 8.

The carbonation results in the carbonated fracking fluid portion 120 that can be directed into the low pressure portion 15 and then into the high-pressure portion 16 of the fracking pump 14. The discharge from the high-pressure portion 16 results in the high-pressure carbonated fracking fluid portion 130.

Figure 5:
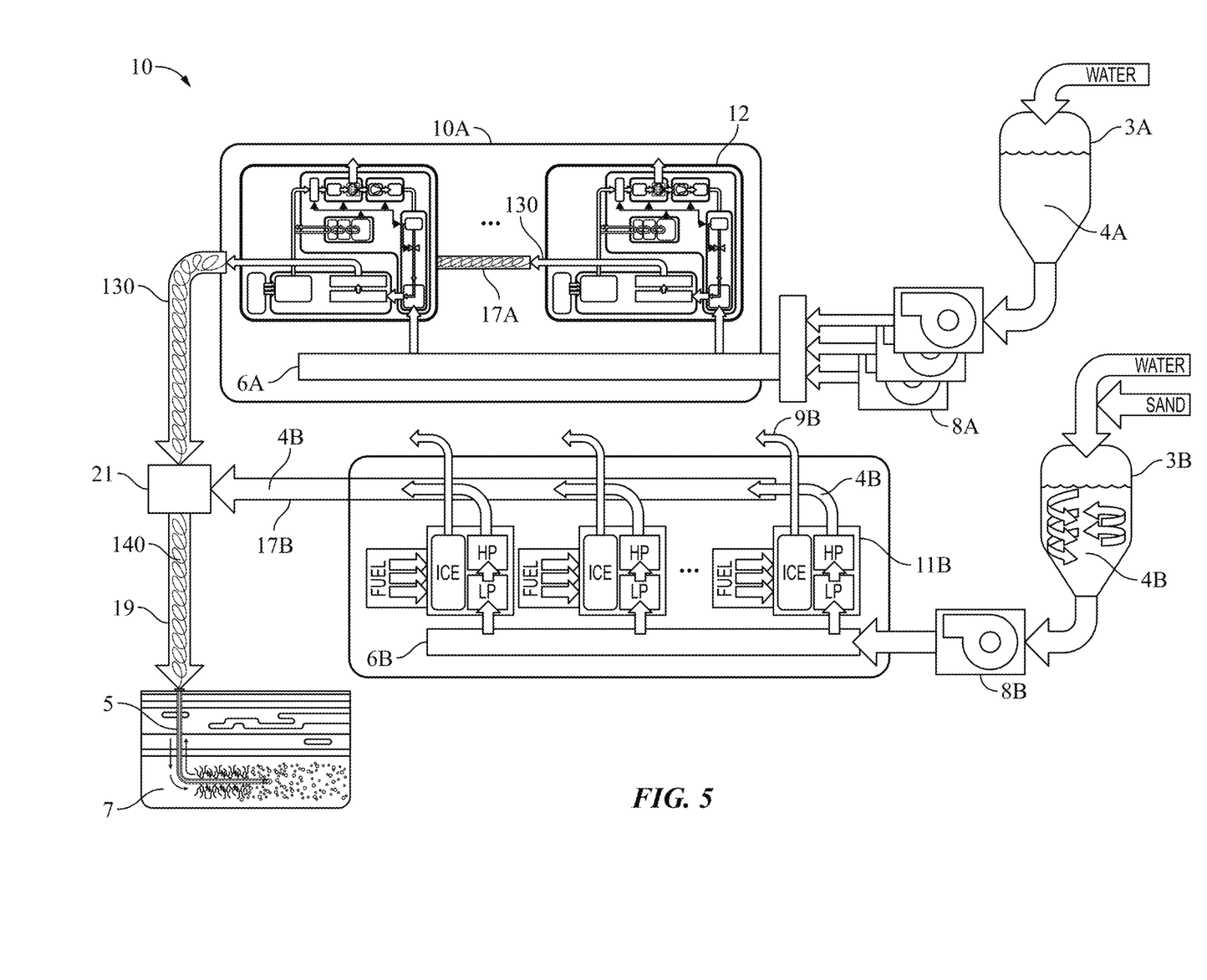
FIG. 5 is a schematic diagram of an embodiment of a carbon dioxide capture fracking system.

FIG. 5 is a schematic diagram of an embodiment of a carbon dioxide capture fracking system. The carbon dioxide capture fracking system 10 incorporates the carbon dioxide capture fracking unit 12 described above. The water fracking portion 4A flows out of the blender 3A, through the discharge pump 8A and into the suction distribution manifold 6A, and into the carbon dioxide capture fracking unit 12. The water fracking fluid portion 4A is carbonated in the carbon dioxide capture fracking unit 12 and discharge as a high-pressure carbonated fracking fluid portion 130 that can flow into the discharge collection manifold 17A. The proppant fracking fluid portion 4B can flow out of the blender 3B and through the discharge pump 8B into the suction distribution manifold 6B and then into the fracking unit 11B, as described in FIG. 2. The discharge is a high-pressure proppant fracking fluid portion 4B that can flow into the discharge collection manifold 17B. The high-pressure carbonated fracking fluid portion 130 in the discharge collection manifold 17A can converge in a fracking combiner 21 with the high-pressure proppant fracking fluid portion 4B to form the carbonated fracking fluid 140. The carbonated fracking fluid 140 can be pumped through a fracking conduit 19 down through the well 5 and into the formation 7 for fracking the formation and for exposing the carbon dioxide in the fracking fluid to the formation for sequestration therein.

Figure 6:
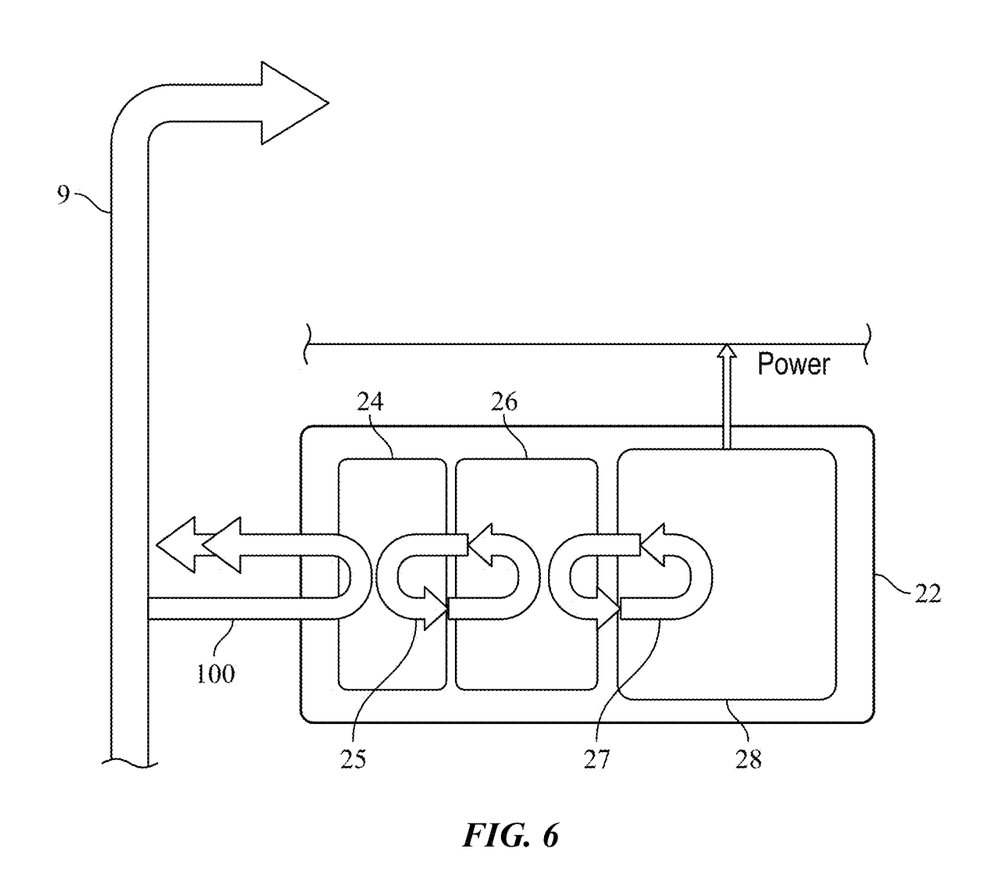
FIG. 6 is a schematic diagram of a waste heat power generation system that optionally can be coupled with the carbon dioxide capture fracking system described herein to provide power to the equipment used during exhaust gas capture and carbonation.

FIG. 6 is a schematic diagram of a waste heat power generation system that optionally can be coupled with the carbon dioxide capture fracking system described herein to provide power to the equipment used during exhaust gas capture and carbonation. The waste heat power generation system 22 can at least partially power the carbon dioxide capture equipment and the carbonation equipment in the embodiments described herein. In at least one embodiment, an Organic Rankine Cycle can be implemented. The system 22 can be incorporated into the overall systems at a point in which the exhaust gas 100 has high energy, generally close to the carbon dioxide capture equipment 30. The temperature of exhaust gas at the ICE is typically higher than 350° C. Further, the heat of an ICE cooling system can also be recovered at around 95° C. Waste heat from the ICE exhaust gas and cooling system can be used to generate mechanical power. The system 22 can receive hot exhaust gas 100 from an outlet of a main exhaust gas flow, pass through a first heat exchanger 24 to transfer some of the exhaust gas heat energy, and then return to the main flow of the combined exhaust gas 100 at a lower temperature. In the first heat exchanger 24, an intermediate fluid known as a thermal oil, can flow in a closed intermediate heat transfer loop 25 that is coupled to both the first heat exchanger 24 and the second heat exchanger 26. The intermediate fluid circulates in its intermediate heat transfer loop 25 back to the first heat exchanger 24 to be reheated by more exhaust gas 101 passing through the first heat exchanger. The intermediate fluid is fluidicly separate from the hot exhaust gas 100 flow, but is heated by the exhaust gas in the first heat exchanger. The intermediate fluid can then heat a working fluid in a similar manner. The working fluid flows in a closed working fluid loop 27 that is coupled to both the second heat exchanger 26 and a power generation unit 28. The working fluid is fluidicly separate from the intermediate fluid, but is heated by the intermediate fluid in the second heat exchanger 26. The intermittent nature of the well construction processes of drilling and/or fracturing creates an intermittent flow of exhaust gases and therefore a fluctuation in the waste heat. To provide a more stable flow of energy in the waste heat power generation system 22, the intermediate fluid in the loop 25 acts as a heat energy buffer between the exhaust gas 9A and the working fluid in the loop 27 to moderate fluctuations in the flow of the exhaust gas and the transferable heat. The working fluid can flow through the loop 27 and power generation unit 28 to generate power such as by mechanically turning a power turbine or other power generation equipment in the carbon dioxide capture fracking unit 12.

Figure 7:
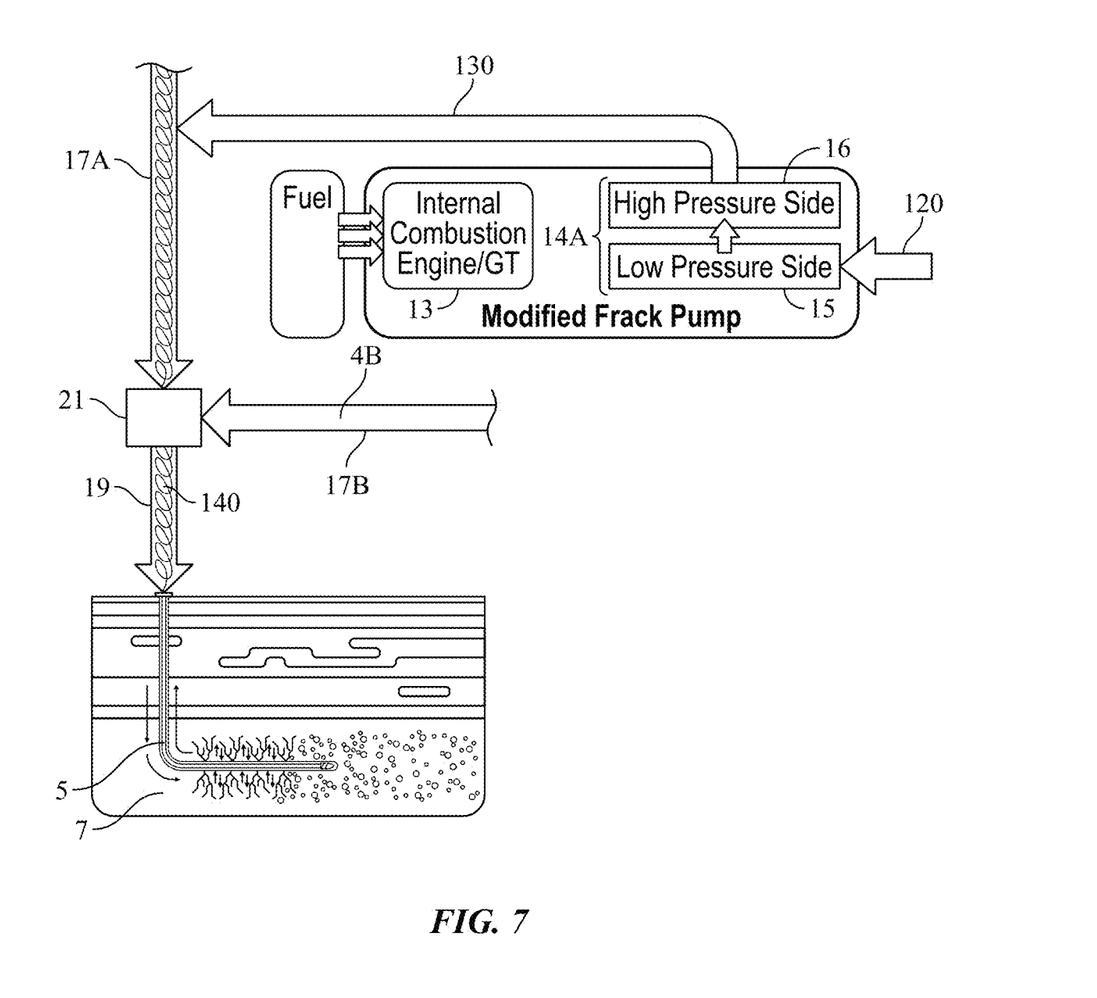
FIG. 7 is a schematic diagram of the water fracking fluid portion and the proppant fracking fluid portion with exemplary pressures and temperatures in the system of FIG. 5.

FIG. 7 is a schematic diagram of the water fracking fluid portion and the proppant fracking fluid portion with exemplary pressures and temperatures in the system of FIG. 5. The pressure can aid in reducing pump cavitation. Cavitation in positive displacement pumps, such as those used in frack pumps for hydraulic fracturing, can be minimized by feeding the suction side of the fracking pump 14A in the low pressure portion 15 with water containing dissolved CO2 at higher pressures sufficient to keep the CO2 in dissolution, because the discharge side of the pump in the high-pressure portion 16 typically operates at pressures higher than 8000 psi to discharge the high-pressure carbonated fracking fluid portion 130 into the discharge collection manifold 17A. Cavitation occurs when the local pressure in the pump falls below the vapor pressure of the water, causing vapor bubbles to form. As these air bubbles move to areas of higher pressure, they can collapse, generating localized shock waves that can damage pump components. By dissolving the carbon dioxide in the water and maintaining a higher pressure on the suction side, the formation of vapor bubbles is reduced. Additionally, the high solubility of carbon dioxide in water and the high pressure on the discharge side of the pump help to ensure that any carbon dioxide bubbles formed during the transfer from the suction side to the discharge side will flash dissolve, preventing cavitation.

The carbonated fracking fluid portion 130 in the discharge collection manifold 17A at a pressure higher than 8000 psi can converge in the fracking combiner 21 with the proppant fracking fluid portion 4B in the discharge collection manifold 17B also at a pressure higher than is 8000 psi to form the carbonated fracking fluid 140. The carbonated fracking fluid 140 can be pumped through the fracking conduit 19 down into the well 5 at about that pressure. As the carbonated fracking fluid descends into the formation, generally, the temperature increases, but at the high-pressure, the carbon dioxide remains in dissolution despite the changes in temperature. The carbon dioxide can be sequestered in the unconventional reservoir by the injection of the fracking fluid. Particularly, in shale reservoirs, the carbon dioxide has a high adsorption preference and can form a basis of the carbon dioxide geological storage. Further, the carbon dioxide can replace methane in the formation by having a 2 to 5 times larger absorption than that of methane. Further, the miscibility of carbon dioxide in an oil system reduces interfacial tension that may promote additional production of oil from the formation.

Figure 8:
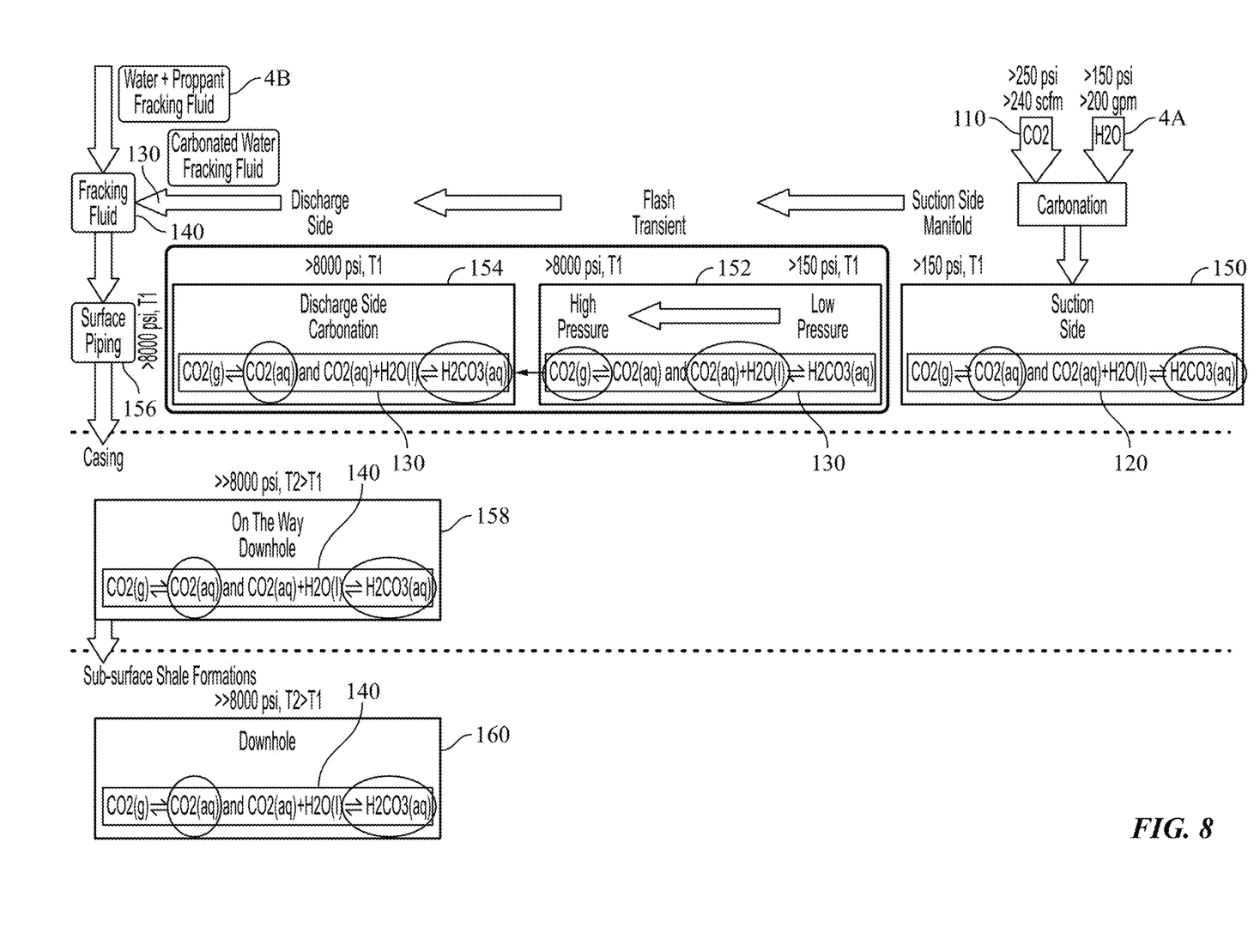
FIG. 8 is an exemplary flow chart that illustrates the changes in pressure and temperatures in the process of the carbonated fracking fluid portion flowing through the fracking pump to the subsurface formation for sequestration.

FIG. 8 is an exemplary flow chart that illustrates the changes in pressure and temperatures in the process of the carbonated fracking fluid portion flowing through the fracking pump to the subsurface formation for sequestration. The flow chart illustrates the effects on the carbon dioxide at the different pressures and temperatures to show the ability of the method to sequester the carbon dioxide in the formation.

It is a known chemistry principle that if a dynamic equilibrium is disturbed by changing the conditions, the position of equilibrium shifts to counteract the change to reestablish an equilibrium. If a chemical reaction is at equilibrium and experiences a change in pressure, temperature, or concentration of products or reactants, the equilibrium shifts in the opposite direction to offset the change. Equilibrium is a concept in chemistry where the system has stabilized, and without an external force that thing will not change. Chemical equilibrium more specifically means when a chemical reaction, like carbon dioxide and water converting to carbonic acid, has reached equilibrium. At chemical equilibrium, the concentrations of each compound will not change unless something changes the system. Chemical equilibrium displays a type of equilibrium called dynamic equilibrium: products are transforming to reactants and reactants are forming products, but these are happening at the same rate so the concentrations of each reactant and product remains the same. When carbon dioxide reacts with water, it is removing carbon dioxide that is dissolved, so to return to equilibrium, more carbon dioxide dissolves into the water, and so on until equilibrium in the different reactions are all reached.

In the exemplary flowchart of FIG. 8, a carbonation step 150 occurs when the water in the water fracking fluid portion 4A enters the carbonation equipment 50 (shown in FIG. 4) at 200 to 250 gallons per minute (gpm) and pressures higher than 150 psi, and the purified carbon dioxide 110 flows into the carbonation equipment 50 at flowrates up to 240 standard cubic feet per minute (scfm) at pressures higher than 250 psi. The combination results in some dissolved carbon dioxide and the creation of carbonic acid that flows to the low-pressure portion 15 of the fracking pump 14A, as the suction side of the pump.

In step 152, the fluid is transferred from the low-pressure side 15 to the high-pressure side 16. The carbonated fracking fluid portion 120 at pressures higher than 150 psi is transitioning to the high-pressure carbonated fracking fluid portion 130 at pressures higher than 8,000 psi. The change in pressure causes a transient state of some of the dissolved carbon dioxide to form a gaseous carbon dioxide and for some of the carbonic acid to become chemically disassociated and a form again dissolved carbon dioxide and water.

In step 154, the transition is complete from the high-pressure portion 16 of the fracking pump for the discharge side and sum of the gaseous carbon dioxide has been dissolved back into the water and some of the dissolved carbon dioxide has formed into the carbonic acid for the high-pressure carbonated fracking fluid portion 130.

In step 156, as described above, the high-pressure carbonated fracking fluid portion 130 is combined with the proppant fracking fluid portion 4B to form the carbonated fracking fluid 140, generally at the surface of the well to be pumped downhole. The pressure of the carbonated fracking fluid can be higher than 8000 psi.

In step 158, the carbonated fracking fluid is pumped downhole and can seek equilibrium as the temperature increases downhole. As pressures are very high, any remaining, gaseous carbon oxide can form more dissolved carbon dioxide, and the dissolved carbon dioxide and water can form more carbonic acid.

In step 160, the carbonated fracking fluid is injected into the subsurface formation, such as a shale formation. As downhole pressures are even higher, the amount of dissolved carbon dioxide increases, and the dissolved carbon dioxide and water can form more carbonic acid.

Other and further embodiments utilizing one or more aspects of the inventions described above can be devised without departing from the disclosed invention as defined in the claims. For example, the terms "wellsite" and "well" are intended to be construed broadly herein to include other types of wellsites and wells, such as unconventional fracking, conventional wellsites, production wells, reinjection wells, water wells, boreholes, and other holes in the Earth's surface, including subsea locations that may use offshore drilling rigs and offshore production platforms. As another example, other embodiments can include other types of injection equipment and other variations than those specifically disclosed herein within the scope of the claims The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. An integrated system for capture of carbon dioxide to dissolve in water for injection and sequestration of the carbon dioxide downhole, the system configured to interface with wellsite exhaust gas generation equipment that generates exhaust gas having carbon dioxide and fracking equipment that injects a flow stream of pressurized fracking fluid into a downhole geological formation, comprising:
    carbon dioxide capture equipment for separating carbon dioxide from the exhaust gas;
    carbonation equipment configured to dissolve the carbon dioxide into water and form a carbonated fracking fluid portion;
    a carbon dioxide capture fracking unit configured to increase pressure of the carbonated fracking fluid portion;
    a proppant fracking fluid portion having proppant;
    a proppant fracking unit configured to increase pressure of the proppant fracking fluid portion;
    a fracking combiner configured to combine the carbonated fracking fluid portion and the proppant fracking fluid portion to form a carbonated fracking fluid; and
    a fracking conduit fluidicly coupled to a subsurface formation for sequestration of carbon dioxide dissolved in the carbonated fracking fluid.

2. The system of claim 1, further comprising a waste heat power generation system configured to generate power from heat energy of the exhaust gas.

3. The system of claim 1, further comprising a blender configured to blend the water with at least one of air, additives, and proppant.

4. The system of claim 1, wherein the carbonation equipment comprises a sparger.

5. A method for sequestering carbon dioxide into a subsurface formation comprising, comprising:
    flowing exhaust gas having carbon dioxide into a carbonation fracking system portion having carbon dioxide capture equipment;
    separating the carbon dioxide from the exhaust gas;
    flowing the carbon dioxide separated from the exhaust gas to carbonation equipment;
    dissolving at least a portion of the carbon dioxide into water to form a carbonated fracking fluid portion;
    flowing the carbonated fracking fluid portion into a carbonation fracking pump;
    pressurizing the carbonated fracking fluid portion to a higher pressure than a pressure before the carbonation fracking pump;
    flowing the carbonated fracking fluid portion into a fracking combiner;
    flowing a mixture of water and proppant to form a proppant fracking fluid portion;
    flowing the proppant fracking fluid portion into a proppant fracking pump;
    pressurizing the proppant fracking fluid portion to a higher pressure than a pressure before the proppant fracking pump;
    flowing the pressurized proppant fracking fluid into the fracking combiner;
    combining the carbonated fracking fluid portion and the proppant fracking fluid portion to form a carbonated fracking fluid;
    flowing the carbonated fracking fluid into a subsurface formation;
    fracking the subsurface formation with the carbonated fracking fluid; and
    sequestering at least a portion of carbon dioxide in the carbonated fracking fluid into the formation.

6. The method of claim 5, wherein separating the carbon dioxide from the exhaust gas comprises releasing remaining exhaust gas.

7. The method of claim 5, further comprising forming a water fracking fluid portion by blending water with air and wherein dissolving the carbon dioxide into the water to form the carbonated fracking fluid portion comprises dissolving the carbon dioxide into the water fracking fluid portion.

8. The method of claim 5, further comprising blending a mixture of water, proppant, and air to form the proppant fracking fluid portion.

9. The method of claim 5, further comprising flowing at least a portion of the exhaust gas through a waste heat power generation system and generating power from heat energy of the exhaust gas.

* * * * *